June 28, 1938. A. L. ROSENHEIMER, JR  2,122,046
PERCOLATOR
Filed Nov. 6, 1936   2 Sheets-Sheet 1

Inventor;
Adolph L. Rosenheimer Jr.

June 28, 1938.  A. L. ROSENHEIMER, JR  2,122,046
PERCOLATOR
Filed Nov. 6, 1936  2 Sheets-Sheet 2

Adolph L. Rosenheimer Jr.

Patented June 28, 1938

2,122,046

UNITED STATES PATENT OFFICE 2,122,046

PERCOLATOR

Adolph L. Rosenheimer, Jr., Kewaskum, Wis., assignor to Kewaskum Aluminum Company, Kewaskum, Wis., a corporation of Wisconsin Application November 6, 1936, Serial No. 109,401

3 Claims. (Cl. 53—3)

This invention relates to certain new and useful improvements in utensils for brewing beverages, and more particularly to coffee percolators.

The feature common to all percolators is a vertical hollow stem standing on the base of the percolator body, the bottom of the stem immersed in the liquid, and the upper end terminating just below a deflector, usually a glass dome in the cover. This stem also carries the ground coffee container or basket and a spreader plate closing the top of the basket.

The liquid, boiling under the base of the tube, bubbles upward against the deflector dome and, dripping down upon the spreader plate seeps through the ground coffee, extracting the essence, and thence down into the body.

In past constructions, the spreader plate was designed to merely lie on the top of the coffee basket, and as a consequence, it was often lifted off of the basket as by the expansion of the coffee grounds due to the soaking action of the liquid, allowing the suds and grounds to escape into the body of the percolator, thereby causing cloudy coffee.

It is therefore an object of this invention to provide a spreader plate that will absolutely prevent the escape of suds or grounds down into the percolator body even though the coffee grounds swell to the point of forcing the spreader plate into contact with the cover of the percolator.

Frequently, the liquid boils too violently and more liquid bubbles up through the stem than can seep through the ground coffee, causing the coffee to "boil over" and leak out at the juncture of the body and the cover.

It is therefore another object of this invention to provide an inset so designed that regardless of the seepage rate of the basket, any amount of liquid can bubble up through the stem and still not overflow down the outside of the percolator.

Another object of this invention is to provide a leak-proof joint at the juncture of the cover and the body by so constructing the coffee basket that it completely closes the opening at the top of the body, thereby causing the cover to seat within the basket rather than within the opening in the body.

Still another object of this invention is to provide a spreader plate so designed that it can be inverted, thereby transforming the percolator into a drip coffee maker.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
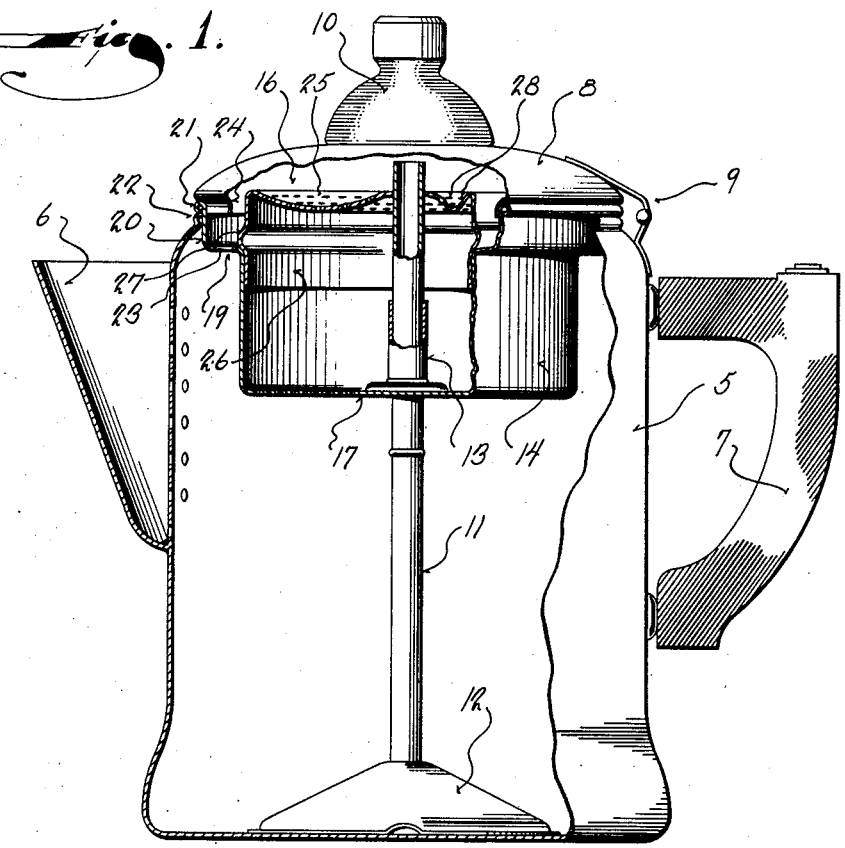
Figure 1 is a side view partially in section of a percolater embodying this invention.
Figure 2:
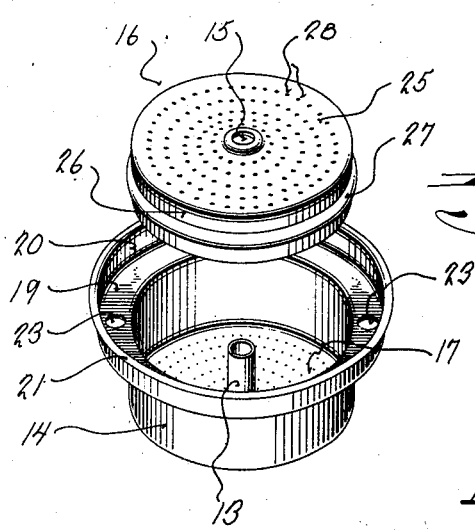
Figure 2 is a perspective view of the coffee basket and the spreader plate.

Referring now particularly to the accompanying drawings in which like numerals indicate like parts throughout the several views, the numeral 5 indicates generally the body of a coffee percolator, having a spout 6, a handle 7, and a cover 8 hingedly connected to the body as at 9 and provided with a glass deflector dome 10.

A hollow stem 11, provided with a base 12, rests on the bottom of the percolator body 5, the stem passing upwardly through a short centering tube 13 fastened vertically to the bottom of a coffee basket 14, and then through an opening 15 in a spreader plate structure 16. The coffee basket 12 is substantially cup-shaped with imperforate vertical sides and a perforated bottom 17. The upper side wall is flanged outwardly as at 19 and then upwardly as at 20, terminating in a bead 21, the portion 20 being adapted to snugly fit the open upper end 22 of the body, and the bead 21 preventing the basket from slipping down into the body.

The flanged portion 19 is provided with a plurality of holes 23 for reasons to be more fully described.

It is readily apparent that the basket completely closes the open upper end 22 of the body, and as the cover 8 is flanged inwardly and downwardly as at 24 in such a manner that it follows the curve of the bead and extends down within the upper part of the basket 12, a leak-proof joint is formed at the juncture of the cover, the basket, and the body.

Slidably receivable in the smaller diameter of the coffee basket is the spreader plate structure 16, consisting of a perforated spreader plate proper, indicated by the numeral 25, and a downturned flange 26 extending therefrom. A bead 27 in the flange 26 limits the distance that the plate can telescope into the basket.

The surface of the spreader plate 25 has a shallow annular concave trough, with perforations 28 evenly distributed over its surface.

The liquid in the body 5 bubbles up through the stem 11 to strike the deflector dome 10 and drip and splash down upon the surface of the spreader plate 25. The holes 28 on the plate 25 allow the boiling water to drip onto the ground coffee, seeping through it and finally draining out through the holes 18 in the bottom of the basket 14.

If the liquid bubbles up through the stem at a faster rate than it can seep through the ground coffee in the basket, it flows off the surface of the spreader plate down through the drain holes 23 and back to the bottom of the body. The size and number of the drain holes 23 make it impossible for the level of the liquid to rise to such a point where it overflows through the joint at the juncture of the cover and the basket.

Occasionally in brewing a maximum amount of coffee in a percolator, the basket is filled with ground coffee to a point where it contacts the spreader plate. Expansion of the grounds due to being soaked with the liquid causes the plate to rise, tending to allow suds and grounds to escape.

Figure 3:
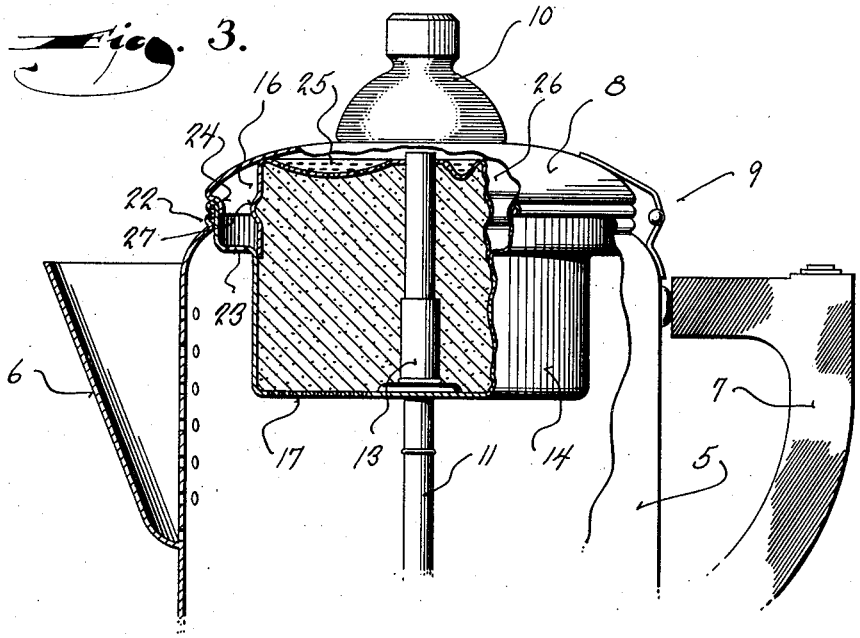
Figure 3 is a side view partially in section with the spreader plate at its extreme raised position.

However, as shown in Figure 3, even if the grounds expand to such an extent that the spreader plate touches the cover 8, the flange 26 is still in contact with the side walls, thereby preventing the escape of any suds and grounds down into the percolator body and assuring clear coffee.

Figure 4:
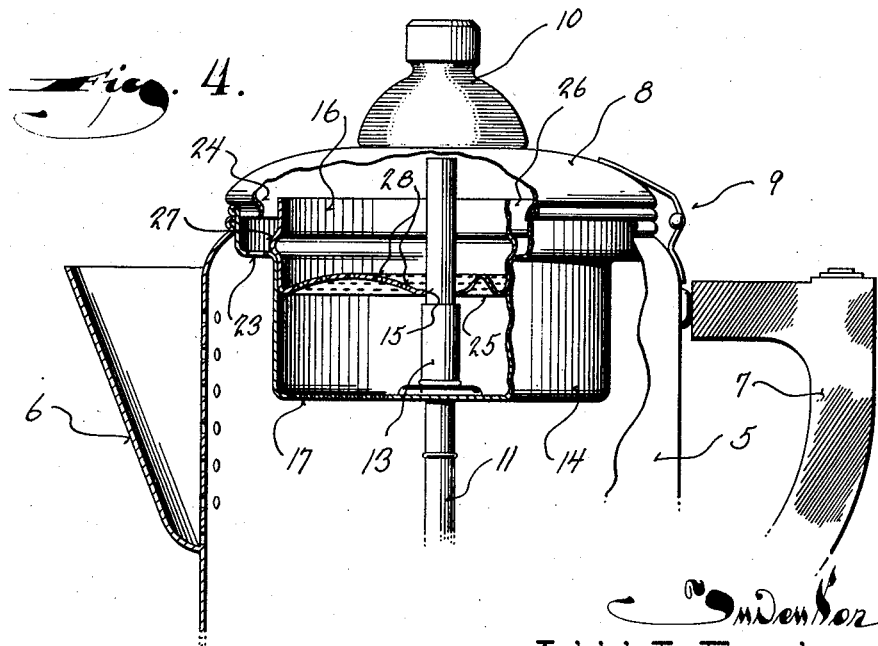
Figure 4 is a side view similar to Figure 1, but with the spreader plate in its inverted position.

As shown in Figure 4, the spreader plate can be inverted, the bead 27 again limiting the distance it fits into the basket, and when used in this manner, the percolator is transformed into an efficient drip coffee maker.

From the foregoing description taken in connection with the accompanying drawings, it will be readily apparent to those skilled in the art to which this invention appertains, that this construction affords a novel means for making clear and unclouded coffee without the risk of having the coffee "boil over", and which when desired can be transformed from a percolator into a drip coffee maker.

What I claim as my invention is:

1. In a coffee percolator including a body and a cover therefor, an inset for the body including a hollow stem and a coffee basket mounted thereon, a spreader plate unit adapted to fit the open top of the coffee basket, said spreader plate unit being substantially cup-shaped and having an imperforate side wall with both ends thereof adapted to telescope into the open top of the basket and having a perforated bottom wall which acts strictly as a spreader plate when the unit is mounted in the coffee basket with the bottom wall uppermost and which provides a perforated bottom for a water reservoir when the unit is inserted into the coffee basket with said bottom wall lowermost, and an outwardly projecting stop on the side wall of the spreader plate unit medially of the two ends thereof adapted to engae the upper marginal edge of the coffee basket for limiting the telescoping of said spreader plate unit into the coffee basket in each instance.

2. In a coffee percolator including a body and a cover therefor, an inset for the body including a hollow stem and a coffee basket mounted thereon, a stepped enlargement on the upper marginal edge of the coffee basket having its outer wall of a diameter to fit the open top of the body and having the juncture between said stepped enlargement and the side wall of the basket defining an abrupt shoulder, a substantially cup-shaped spreader plate unit having an imperforate cylindrical side wall of a diameter throughout its entire length such as to slidably nest into the coffee basket, and an annular out-struck bead formed in the side wall of the spreader plate unit medially of its upper and lower ends to engage said abrupt shoulder of the coffee basket and limit downward insertion of the spreader plate unit into the coffee basket with the spreader plate unit inserted either upright or inverted, and said side wall of the spreader plate unit being of sufficient length to provide a long surface to surface engagement between it and the side wall of the coffee basket to preclude the escape of suds from the coffee basket even though the spreader plate unit is lifted by expansion of the coffee grounds.

3. In a coffee percolator including a body and a cover therefor, an inset for the body including a hollow stem and a coffee basket mounted thereon, the coffee basket having a shoulder located medially of its top and bottom, a spreader plate unit adapted to fit the open top of the coffee basket, said spreader plate unit being substantially cup-shaped with a perforated bottom and a substantially cylindrical side wall, the outside diameter of which is substantially uniform and slightly less than that of the shouldered portion of the coffee basket so as to have a telescoping fit in the shouldered portion of the basket, and a stop on the side wall of the spreader plate unit located medially of its top and bottom to engage the shoulder on the coffee backet for limiting the telescoping of said spreader plate unit into the coffee basket.

ADOLPH L. ROSENHEIMER, Jr.